United States Patent
Awan et al.

(10) Patent No.: US 11,434,759 B2
(45) Date of Patent: Sep. 6, 2022

(54) OPTIMIZATION OF DISCRETE FRACTURE NETWORK (DFN) USING STREAMLINES AND MACHINE LEARNING

(71) Applicant: Saudi Arabian Oil Company, Dhahran (SA)

(72) Inventors: Anwar Rahim Awan, Dhahran (SA); Otto E. Meza Camargo, Dhahran (SA); Mustafa Amari, Dhahran (SA); Marei Al-Garni, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 190 days.

(21) Appl. No.: 16/922,769

(22) Filed: Jul. 7, 2020

(65) Prior Publication Data
US 2022/0010678 A1    Jan. 13, 2022

(51) Int. Cl.
*E21B 49/00*    (2006.01)
*E21B 49/08*    (2006.01)
*G06N 3/04*     (2006.01)
*G06N 3/08*     (2006.01)

(52) U.S. Cl.
CPC .......... *E21B 49/0875* (2020.05); *E21B 49/00* (2013.01); *G06N 3/04* (2013.01); *G06N 3/08* (2013.01); *E21B 2200/20* (2020.05)

(58) Field of Classification Search
CPC .. E21B 49/00; E21B 49/0875; E21B 2200/20; G01V 99/005
See application file for complete search history.

(56) References Cited

U.S. PATENT DOCUMENTS

| | | |
|---|---|---|
| 10,607,043 B2 | 3/2020 | Camargo et al. |
| 2008/0077371 A1 | 3/2008 | Yeten et al. |
| 2015/0149142 A1 | 5/2015 | Li et al. |
| 2015/0377005 A1 | 12/2015 | Garcia-Teijeiro et al. |

(Continued)

FOREIGN PATENT DOCUMENTS

CN    102279419 B    12/2011

OTHER PUBLICATIONS

Anwar, Awan R. et al.; "An Effective Streamline History Matching Technique" SPE-188073-MS, SPE Kingdom of Saudi Arabia Annual Technical Symposium and Exhibition, Dammam, Apr. 24-27, 2017; pp. 1-6.

(Continued)

*Primary Examiner* — Catherine Loikith
(74) *Attorney, Agent, or Firm* — Bracewell LLP; Constance G. Rhebergen; Brian H. Tompkins

(57) ABSTRACT

A methodology is provided to optimize the dynamic connectivity of a discrete fracture network (DFN) model of a subsurface reservoir against observed reservoir production measures using streamlines and machine learning. Adjustment of discrete fracture network properties of the reservoir is made locally and minimizes computer processing time spent in history matching. An iterative workflow identifies history match issues between measured and predicted or simulated water cut of reservoir produced fluids. Streamline analysis quantifies injector-producer communication and identifies reservoir grid block bundles that dominate dynamic response. A genetic algorithm updates discrete fracture network properties of the reservoir model to improve dynamic history match response.

36 Claims, 12 Drawing Sheets

(56) References Cited

U.S. PATENT DOCUMENTS

| | | | |
|---|---|---|---|
| 2016/0196367 A1* | 7/2016 | Petukhov | E21B 43/26 703/2 |
| 2017/0205531 A1 | 7/2017 | Berard et al. | |
| 2017/0275970 A1 | 9/2017 | Crawford et al. | |
| 2018/0010429 A1 | 1/2018 | Willberg et al. | |
| 2018/0322232 A1 | 11/2018 | Klinger et al. | |
| 2019/0080122 A1 | 3/2019 | Camargo et al. | |
| 2019/0345815 A1 | 11/2019 | Mishra | |
| 2020/0095858 A1 | 3/2020 | Bouaouaja et al. | |

OTHER PUBLICATIONS

Barton, Colleen A. et al.; "Fluid flow along potentially active faults in crystalline rock" Geology v. 23; No. 8; Aug. 1995; pp. 683-686.

Dogru, Ali H. et al.; "A Next-Generation Parallel Reservoir Simulator for Giant Reservoirs" SPE 119272, SPE Reservoir Simulation Symposium The Woodlands, Texas, Feb. 2-4, 2009; pp. 1-29.

Dogru, Ali H. et al.; "New Frontiers in Large Scale Reservoir Simulation" SPE 142297, SPE Reservoir Simulation Symposium, The Woodlands, TX, Feb. 21-23, 2011; pp. 1-12.

Min, Ki-Bok et al.; "Stress-Dependent Permeability of Fractured Rock Masses: A Numerical Study" International Journal of Rock Mechanics and Mining Sciences, vol. 41, Issue 7 (2004); pp. 1191-1210.

Rogers, Stephen F.; "Critical stress-related permeability in fractured rocks" Chpt 2, Fracture and In-Situ Stress Characterization of Hydrocarbon Reservoirs, (Ameen) Geoscience World, The Geological Society of London, 2003, pp. 7-16.

Wikipedia "Mohr's circle" available as of Jul. 21, 2020 at: htts://en.wikipedia.org/wiki/Mohr's_circle; pp. 1-15.

Zoback, Mark D.; "Critically stressed faults and fluid flow" Reservoir Geomechanics chapter 11, Cambridge University Press, 2007; pp. 1-40.

International Search Report and Written Opinion for International Application No. PCT/US2021/040689, report dated Oct. 21, 2021; pp. 1-22.

Kang, SukSang et al.; "A hierarchical model calibration approach with multiscale spectral-domain parameterization: Application to a structurally complex fractured reservoir" Jornal of Petroleum Science and Engineering 135 (2015); pp. 336-351.

\* cited by examiner

High water production

Low water production

No water breakthrough

OPTIMIZATION OF DISCRETE FRACTURE NETWORK (DFN) USING STREAMLINES AND MACHINE LEARNING

BACKGROUND OF THE INVENTION

1. Field of the Invention

The present invention relates to petroleum exploration and production, and more particularly to reservoir engineering, and in particular determining a location for drilling a well in a subsurface geological structure of a subsurface hydrocarbon reservoir having existing wells producing fluids comprising hydrocarbons and exhibiting water cut representing water mixed in the fluids being produced.

2. Description of the Related Art

Planning and management of drilling or fracturing operations for hydrocarbon production from producing subsurface reservoirs involves well completion design, well spacing and placement strategies. For these purposes, it has been important to have an accurate model of the subsurface rock formations and their characteristics to be able to obtain increased production of hydrocarbon fluids from a producing reservoir.

Natural fractures present in subsurface formations are discontinuities representing a surface or zone of mechanical failure in the formation. Natural fractures have been formed over geological time as a result of movements and deformations within the subsurface rock over time. Natural fractures continue to be formed as a result of microseismic events which are slight tremors or movements in the earth's crust arising from various natural sources. Natural fractures are thus different in origin and nature from fractures induced in earth formations from the practice of hydraulic fracturing or fracking.

Natural fracture prediction is one of the more challenging problems in reservoir characterization. Fracture distributions are related to various factors such as intrinsic rock mechanics properties, as well as movements and deformation of the formation rock layers due to different tectonic stages to which the lithological formations are subjected through geological time.

In highly complex geological environments due to different tectonics, an accurate model of the natural fracture distributions and their properties is important for conducting hydrocarbon exploration and development programs. A natural fracture can define a geological trap indicating possible flow passage for fluids in the reservoir. Natural fractures reduce the risk of unsuccessful results in drilling operations, and have an impact on reservoir management.

Hydrocarbons accumulate over geological time in a reservoir in the primary porous medium of the formation rock, and also in secondary porous media formed by natural fractures and in other areas of porosity such as vugs, caverns, and the like in the formation rock. Natural fractures as secondary storage mechanisms for hydrocarbon accumulation play an important role in some tight reservoir fields, enhancing the capacity to produce hydrocarbons from such reservoirs. Natural fractures enhance the permeability and connectivity between the primary porous media of the formation rock, and also support the flow of hydrocarbons into the wellbore. Natural fractures can also connect the porous and non-porous media of different rock layers of a reservoir in lower permeability conditions or situations.

Once a discrete fracture network model has been formed and adopted for a producing reservoir, it serves as a basis for reservoir management and subsequent drilling. The accuracy of the fracture network model must be determined and confirmed periodically. This has been formed by what is known as history matching reservoir simulation. This has been done based on dynamic data, which are time dependent measures of flow and pressures in the reservoir wells observed from production from existing wells in the producing reservoir.

Discrete fracture network (DFN) models are widely used in the oil industry to model naturally fractured reservoirs. However, it is a challenge to history match DFN models at well level (or locally) due to complex systems of natural fractures and large uncertainty related to their modeling. Conventional history match methods have, so far as is known, not been capable of identification of grid cells of the reservoir model exhibit properties which fractures need to be modified in order to attain a satisfactory history match at well level. As a result, history matching dynamic behavior of each producer has, so far as is known, required long computer processor reservoir simulation processing time. Further, the processing results have at times resulted in unnecessary local modifiers. The alterations (permeability, porosity, and the like) were made generally in the immediate vicinity of individual wells, to reflect local changes. Such changes would at times indicate a degree of heterogeneity which was not properly extended throughout the rest of the model. As a result, infill wells added after the history match would not be affected by the applied modifier. Such models might have had a perfect history match at a certain point of time, but yet might have poor predictability and not be reliable for new drilling designs and reservoir management.

SUMMARY OF THE INVENTION

Briefly, the present invention provides a new and robust method of history matching the dynamic connectivity of a discrete fracture model (DFN) of a subsurface reservoir against observed reservoir production measures using streamlines and machine learning. The history matched simulation model can later be utilized for important reservoir management decisions and determining the location for drilling the well.

Reservoir parameters are obtained representing properties of the subsurface reservoir for processing in a data processing system. The reservoir properties include observed cumulative water cut of the produced fluids during production from the existing wells. A proposed discrete fracture network model is formed indicating the nature and extent of discrete fractures and fracture flow paths in the reservoir, and a reservoir simulation history match is performed based on the obtained reservoir parameters to determine simulated cumulative water cut of the fluids.

A measure of the difference between the determined simulated cumulative water cut from the performed reservoir simulation history match and the observed water cut of the produced hydrocarbon fluids from the existing wells is obtained. A determination is then made whether the determined simulated cumulative water cut from the performed reservoir simulation history match matches specified production criteria.

When the determined simulated cumulative water cut from the performed reservoir simulation history match does not match specified production criteria, the proposed discrete fracture network model is adjusted by a genetic algorithm optimization to form another proposed discrete fracture network for optimization of the natural fracture network of the reservoir. An amount and type of water cut present in the determined simulated cumulative water cut is determined from the performed reservoir simulation history match results.

Streamline analysis of fluid flow in the reservoir is performed based on the proposed discrete fracture network and the determined simulated cumulative water cut to identify the fracture flow paths for the fluids in the reservoir, and processing returns to form another realization of a proposed discrete fracture network for continued processing.

When the determined cumulative water cut from the performed reservoir simulation history match satisfies the specified production criteria, the proposed discrete fracture network is adjusted to conform to the optimized natural fracture network. The proposed well is then drilled at the location indicated by the optimized natural fracture network.

The present invention also provides a new and improved data processing system for determining a location for drilling a well in a subsurface geological structure of a subsurface hydrocarbon reservoir which has existing wells producing fluids comprising hydrocarbons. The well fluids also exhibit water cut representing water mixed in the fluids being produced. The location for drilling the well is determined indicated by an optimized natural fracture network model of the reservoir determined by the data processing system.

The data processing system includes a memory storing computer operable program instructions to control the data processing system to optimize the natural fracture network, and a data input obtaining reservoir parameters representing properties of the subsurface reservoir for processing in a data processing system. The obtained reservoir properties include observed cumulative water cut of the produced fluids during production from the existing wells.

The data processing system further includes a processor operating under the control of the stored computer operable program instructions to perform a sequence of processing steps. The processing performed includes forming a proposed discrete fracture network model indicating the nature and extent of discrete fractures and fracture flow paths in the reservoir, and performing a reservoir simulation history match from the obtained reservoir parameters to determine simulated cumulative water cut of the fluids.

The data processing system then determines a measure of the difference between the determined simulated cumulative water cut from the performed reservoir simulation history match and the observed water cut of the produced hydrocarbon fluids from the existing wells, and whether the determined simulated cumulative water cut from the performed reservoir simulation history match matches specified production criteria.

When the determined simulated cumulative water cut from the performed reservoir simulation history match does not match specified production criteria, the data processing system determines an amount and type of water cut present in the determined simulated cumulative water cut from the performed reservoir simulation history match.

The data processing system then adjusts the proposed discrete fracture network model by a genetic algorithm optimization to form another proposed discrete fracture network for optimization of the natural fracture network of the reservoir.

The data processing system performs streamline analysis of fluid flow in the reservoir based on the proposed discrete fracture network and the determined simulated cumulative water cut to identify the fracture flow paths for the fluids in the reservoir. The data processing system then returns and repeats the processing to form another realization of a proposed discrete fracture network for continued processing.

When the determined cumulative water cut from the performed reservoir simulation history match satisfies the specified production criteria, the data processing system adjusts the proposed discrete fracture network to conform to the optimized natural fracture network so that the proposed well is drilled at a location indicated by the optimized natural fracture network.

The present invention further provides a new and improved computer implemented method of determining a location for drilling a well in a subsurface geological structure of a subsurface hydrocarbon reservoir having existing wells which producing fluids. The produced fluids contain hydrocarbons and exhibit water cut, representing water mixed in the fluids being produced. The location of the well is determined as indicated by an optimized natural fracture network model of the reservoir.

The computer implemented method is performed in a data processing system having a memory, a processor and a reservoir simulation history match module. The computer implemented method is performed in a sequence of the steps including storing in the data processing memory computer operable program instructions to control the data processing system to optimize the natural fracture network.

Reservoir parameters are obtained representing properties of the subsurface reservoir for processing in a data processing system, the reservoir properties including observed cumulative water cut of the produced fluids during production from the existing wells. A proposed discrete fracture network model indicating the nature and extent of discrete fractures and fracture flow paths in the reservoir is then formed, and a reservoir simulation history match performed from the obtained reservoir parameters to determine simulated cumulative water cut of the fluids.

A measure of the difference between the determined simulated cumulative water cut from the performed reservoir simulation history match and the observed water cut of the produced hydrocarbon fluids from the existing wells is then determined. A determination is made whether the determined simulated cumulative water cut from the performed reservoir simulation history match matches specified production criteria.

When the determined simulated cumulative water cut from the performed reservoir simulation history match does not match specified production criteria, an amount and type of water cut present in the determined simulated cumulative water cut is then determined from the performed reservoir simulation history match. The proposed discrete fracture network model is then adjusted by a genetic algorithm optimization to form another proposed discrete fracture network for optimization of the natural fracture network of the reservoir.

Streamline analysis of fluid flow in the reservoir is then performed based on the proposed discrete fracture network and the determined simulated cumulative water cut to identify the fracture flow paths for the fluids in the reservoir. Processing is then repeated to form another realization of a proposed discrete fracture network for continued processing.

When the determined cumulative water cut from the performed reservoir simulation history match satisfies the specified production criteria, the proposed discrete fracture network to conform to the optimized natural fracture network so that the proposed well may be drilled at the location indicated by the optimized natural fracture network.

The present invention also provides a new and improved data storage device having stored in a non-transitory computer readable medium computer operable instructions which cause a data processing system to determine a location for drilling a well in a subsurface geological structure of a subsurface hydrocarbon reservoir having existing wells. The wells are producing hydrocarbon fluids, in which water cut is present, representing water mixed in the produced fluids. The well location is indicated by an optimized natural fracture network model of the reservoir. The data processing system operating under control of the stored instructions includes a memory, a processor and a reservoir simulation history match module.

The instructions cause the data processing system to perform a sequence of steps, including storing in the data processing memory computer operable program instructions to control the data processing system to optimize the natural fracture network, and obtaining reservoir parameters representing properties of the subsurface reservoir for processing in a data processing system, the reservoir properties including observed cumulative water cut of the produced fluids during production from the existing wells.

The stored instructions next cause a proposed discrete fracture network model to be formed indicating the nature and extent of discrete fractures and fracture flow paths in the reservoir and then performance of a reservoir simulation history match from the obtained reservoir parameters to determine simulated cumulative water cut of the fluids.

The stored instructions also cause determination of a measure of the difference between the determined simulated cumulative water cut from the performed reservoir simulation history match and the observed water cut of the produced hydrocarbon fluids from the existing wells, and whether the determined simulated cumulative water cut from the performed reservoir simulation history match matches specified production criteria.

When the determined simulated cumulative water cut from the performed reservoir does not match specified production criteria, the stored instructions cause an amount and type of water cut present in the determined simulated cumulative water cut from the performed reservoir simulation history match to be determined.

The stored instructions next cause adjustment of the proposed discrete fracture network model by a genetic algorithm optimization to form another proposed discrete fracture network for optimization of the natural fracture network of the reservoir. The instructions then cause streamline analysis of fluid flow in the reservoir to be performed based on the proposed discrete fracture network and the determined simulated cumulative water cut to identify the fracture flow paths for the fluids in the reservoir, followed by The stored instructions then cause processing to return and repeat the processing to form another realization of a proposed discrete fracture network for continued processing.

When the determined cumulative water cut from the performed reservoir simulation history match satisfies the specified production criteria, the stored instructions then cause the data processing system to adjust the proposed discrete fracture network to conform to the optimized natural fracture network. The proposed well may then be drilled at the location indicated by the optimized natural fracture network.

DETAILED DESCRIPTION OF THE PREFERRED EMBODIMENTS

Figure 1:
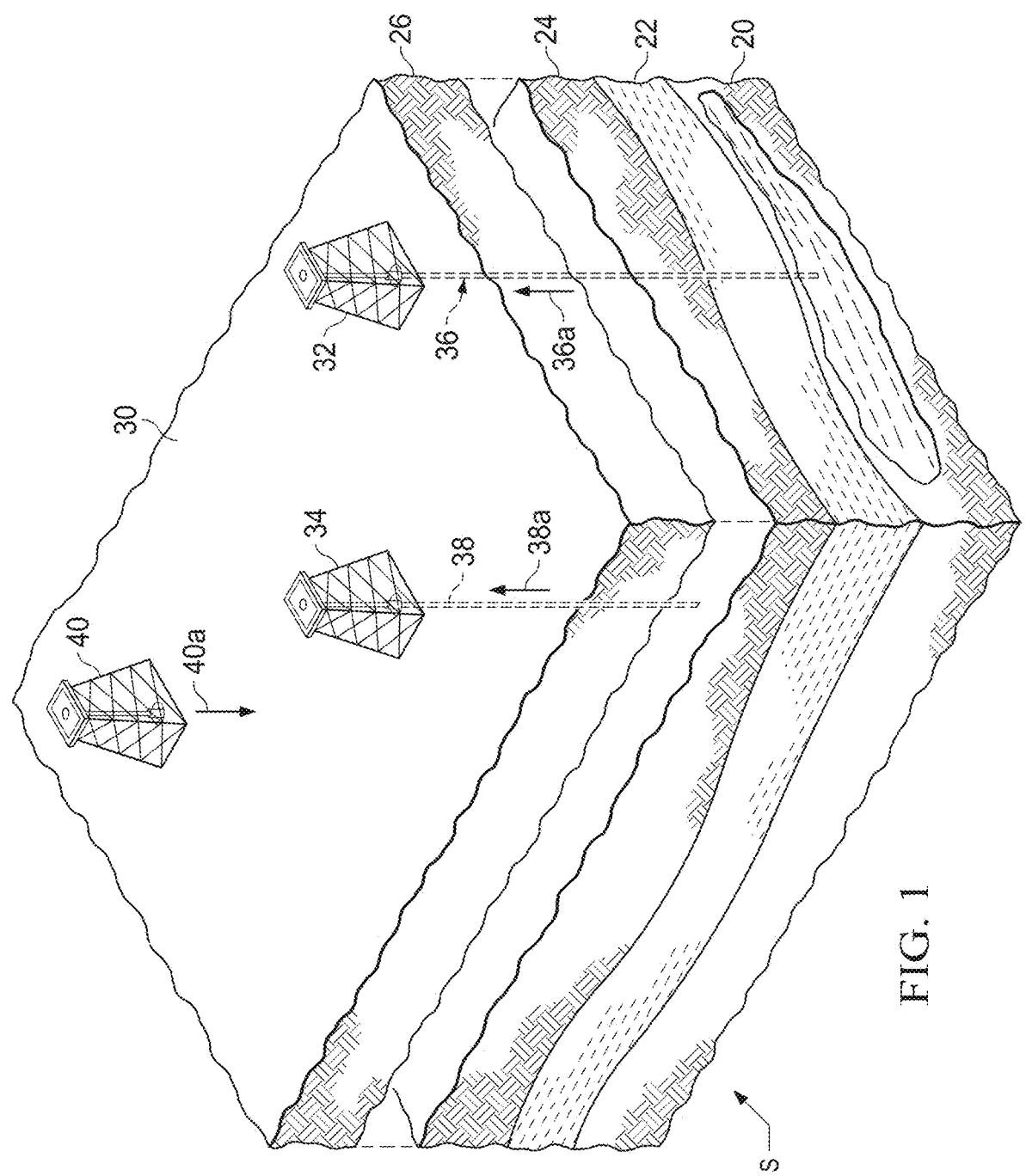
FIG. 1 is a schematic diagram of three dimensional subsurface formations in the earth at a location of a subsurface reservoir where producing and injector wells are present.

In the drawings, FIG. 1 is an isometric view in schematic form of subsurface geological structure S or formations in the earth at a location where a subsurface hydrocarbon reservoir indicated schematically at R in a hydrocarbon producing formation rock layer 20 is present. As shown in FIG. 1, the hydrocarbon producing formation rock layer 20 is present beneath several other formation rock layers, such as indicates at 22, 24 and 26 below the earth surface 30. As indicated at 32 and 34, exploratory or production wells have been drilled to penetrate the earth formations through wellbores as indicated at 36 and 38. An injection well 40 is also present, having been drilled for injection of water into the reservoir for increased production, as indicated schematically by a flow arrow 40a.

Over the life of production from the reservoir R, fluids are transported upwardly in production wells 32 and 34 as indicated schematically by flow arrows 36a and 38a, respectively. The reservoir fluids contain hydrocarbon fluids and water. The water may be either water from lower depths in the formation, or water injected from injection well 40. The water present in the produced fluids from wells 32 and 34 is known as water cut and is measured as a percentage of the volume of reservoir fluids produced.

Figure 2:
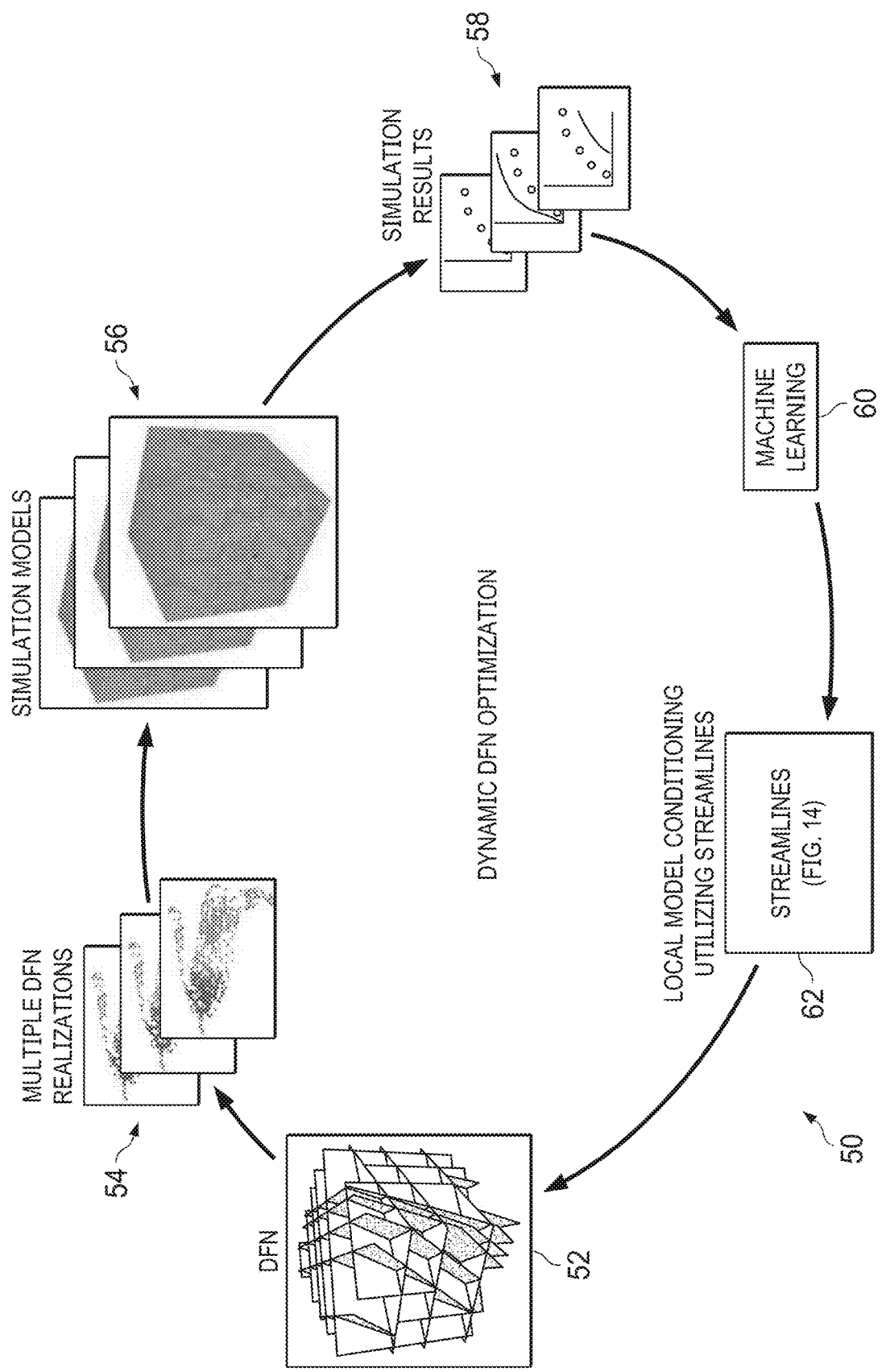
FIG. 2 is a schematic diagram of a workflow for reservoir engineering with optimized discrete fracture network (DFN) models according to the present invention.
Figure 3:
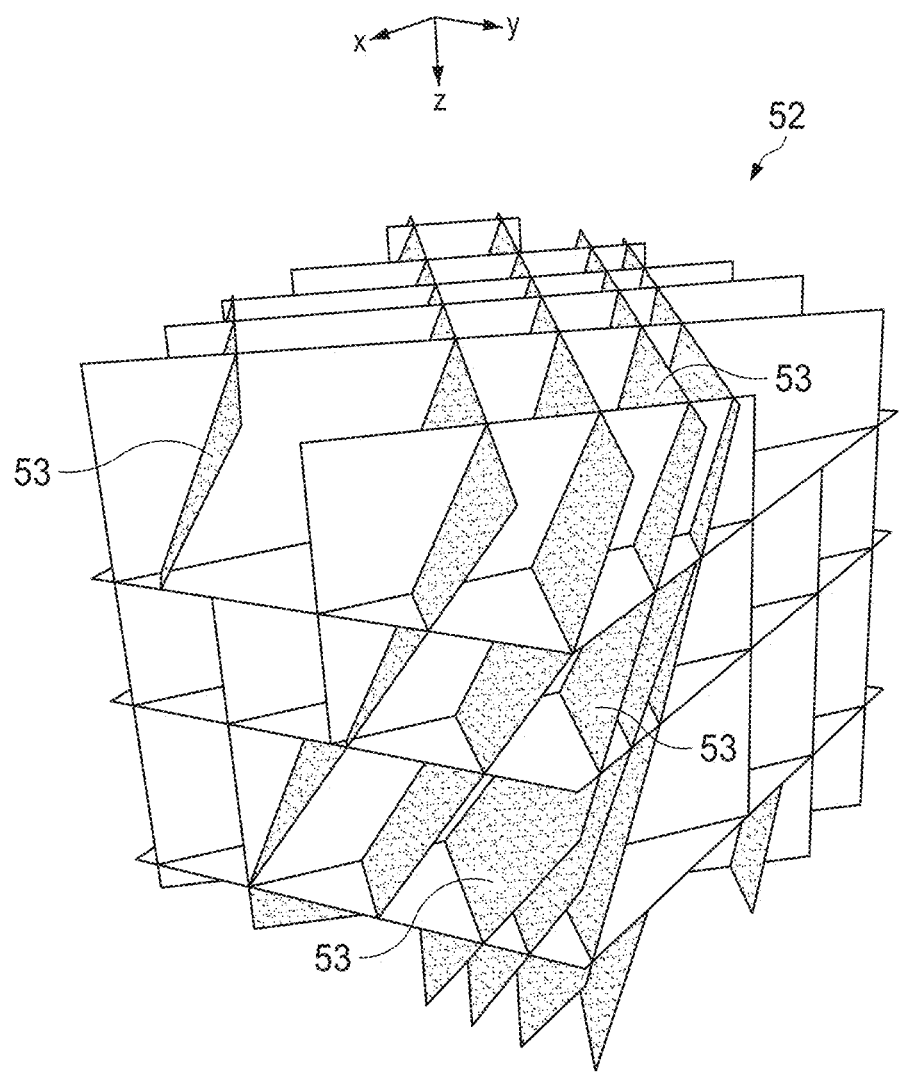
FIG. 3 is an isometric view of a computerized discrete fracture network (DFN) model of subsurface rock formations in a region of interest for hydrocarbon production according to the present invention.

FIG. 2 is a high level schematic diagram of the methodology of the present invention illustrated schematically at 50 for reservoir hydrocarbon exploration, and in particularly the location and completion of wells for hydrocarbon production. As indicated at 52 in FIG. 2, an initial discrete fracture network or DFN is present. FIG. 3 is an enlarged view of the discrete fracture network 52 containing as indicated at 53 the location of identified fractures in three-dimensional space according to the x, y, and z co-ordinates in a computerized grid model of the subsurface reservoir R. The initial discrete fracture network 52 may be formed, for example, according to the methodology described in one or both of commonly owned, related U.S. patent application Ser. No. 16/695,946, "Modeling Reservoir Permeability through Estimating Natural Fracture Distribution and Properties," filed Nov. 26, 2019, and now U. S. Published Patent Application No. 2020/0095858; and U.S. patent application Ser. No. 15/704,316, "Subsurface Reservoir Model with 3D Natural Fractures Prediction," filed Sep. 14, 2017, now U.S. Pat. No. 10,607,043 dated Mar. 31, 2020. The disclosure of each of these applications is expressly incorporated by reference herein.

As indicated schematically at 54, the discrete fracture network 52, a geomechanical model of the subsurface reservoir R, and reservoir fluid production flows, flow rates and pressures obtained are processed to form a sequence of multiple discrete fracture network realizations, as will be described. Each of the sequence of multiple discrete fracture network realizations as so formed is then used as indicated at 56 as a basis for history match reservoir simulation of water cut in fluid production by a reservoir simulation/history match module M (FIG. 18) of the data processing system D.

Figure 8:
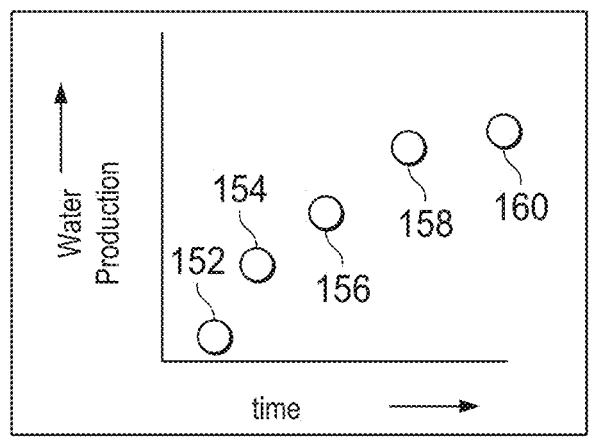
Figure 9:
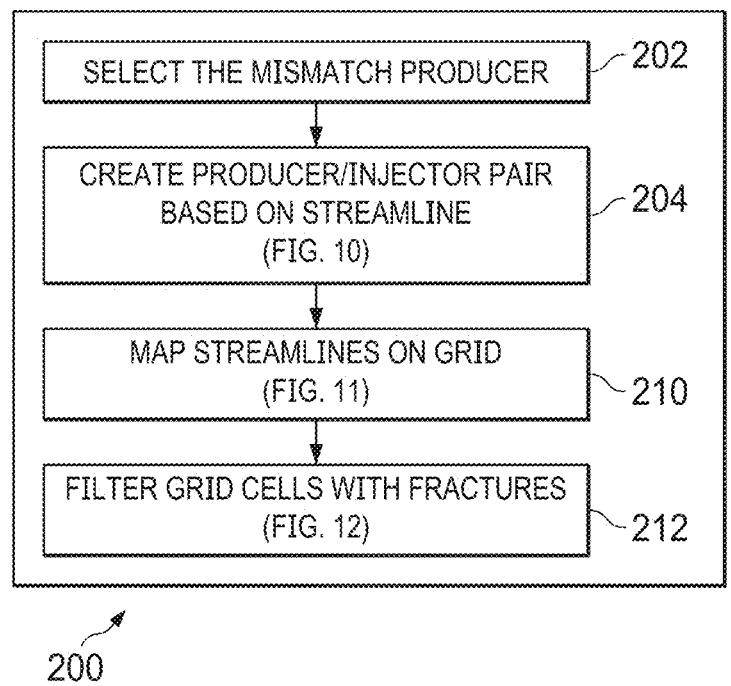
FIG. 9 is a schematic diagram of a workflow for streamline analysis processing according to FIG. 5.
Figure 10:
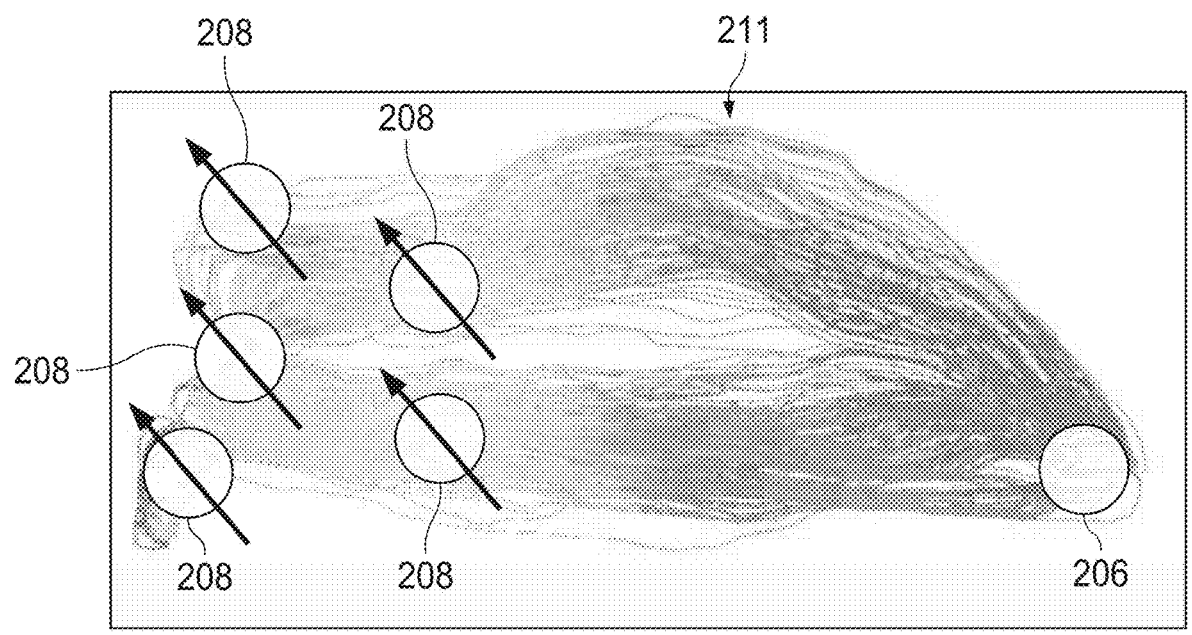
FIGS. 10, 11, 12, 13, 14 and 15 are example displays illustrating a sequence of results of streamline analysis during the workflow of FIG. 9 for identification of fracture flow paths in a subsurface reservoir according to the present invention.

The results of the history match reservoir simulation of water cut in fluid production so formed are available as displays, indicated schematically at 58 in FIG. 2, in the form of outputs from the data processing system D. Examples of such history match reservoir simulation of water cut in fluid production are shown in FIGS. 8, 9 and 10.

Returning to FIG. 2, as indicated at 60, the current proposed discrete fracture network model which was the basis for the history match reservoir simulation of water cut is then adjusted by a genetic algorithm optimization to form another proposed discrete fracture network for optimization of the natural fracture network of the reservoir.

During step 62 a streamline analysis of fluid flow in the reservoir is performed based on the adjusted discrete fracture network to identify the fracture flow paths for the fluids in the reservoir. Processing then returns as indicated in FIG. 2, with the adjusted discrete fracture network with identified fracture flow paths for the fluids serving as the discrete fracture network for a further iteration of processing in the manner described.

Discrete Fracture Network Model

The computerized discrete fracture network (DFN) model 52 of subsurface rock formations represents the location and extent of identified and predicted fractures 64 in a region of interest in the subsurface reservoir R. The locations are in x, y and z co-ordinates of a three dimensional computerized grid shown in FIG. 3.

Natural fractures in reservoirs can also be present across a wide range of scale, ranging from microfractures to extensive fractures or faults of thousands of meters. The vertical extent of natural fractures is often controlled by thin layers in the form of shale beds or laminations, or by weak layers of rock in carbonate sequences in the earth.

Natural fractures are abundant structural features in the earth. As described above, natural fractures may be caused by a variety of factors including stress in the formation from tectonic forces, which cause folds and the like. It is typical that a hydrocarbon producing reservoir contains some natural fractures, but as described the location and extent of such natural fractures is not directly determinable. Natural fractured reservoirs are difficult systems to characterize and difficult to engineer and predict. Natural fractured reservoirs are an important element in reservoir performance, and it is also important to recognize the performance characteristics of a naturally fractured reservoir.

Natural fractures can significantly affect hydrocarbon migration and trap location in the subsurface formations, as well as flow of hydrocarbons to wellbores during production. Knowledge of the presence and extent of natural fractures can significantly improve reservoir development and reduce hydrocarbon production risks.

An iterative workflow is built to identify history match issues, provide insights into DFN and improve history match quality. The disclosed invention utilizes streamline analysis in quantifying injector-producer communication and identifying the grid block bundles that dominate dynamic response. Afterwards, a genetic algorithm updates DFN model properties to improve dynamic history match response.

Figure 4:
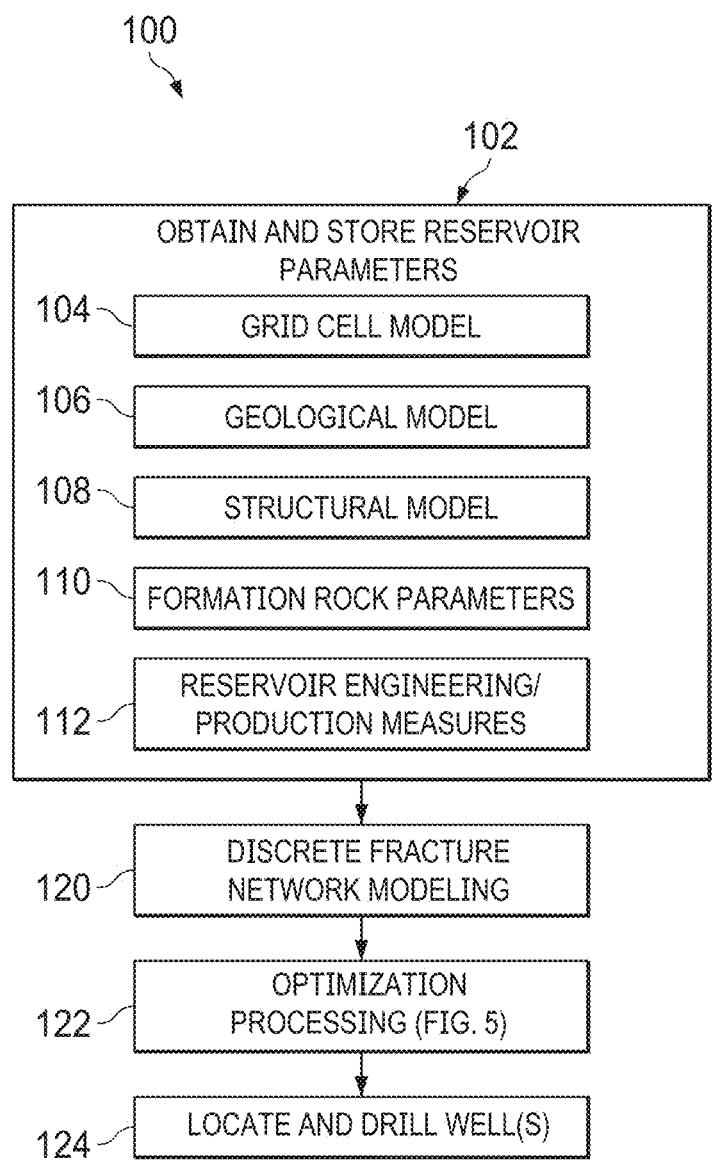
FIG. 4 is a schematic diagram of a workflow for determining a location for drilling a well in a subsurface geological structure of a subsurface hydrocarbon reservoir according to the present invention.
Figure 18:
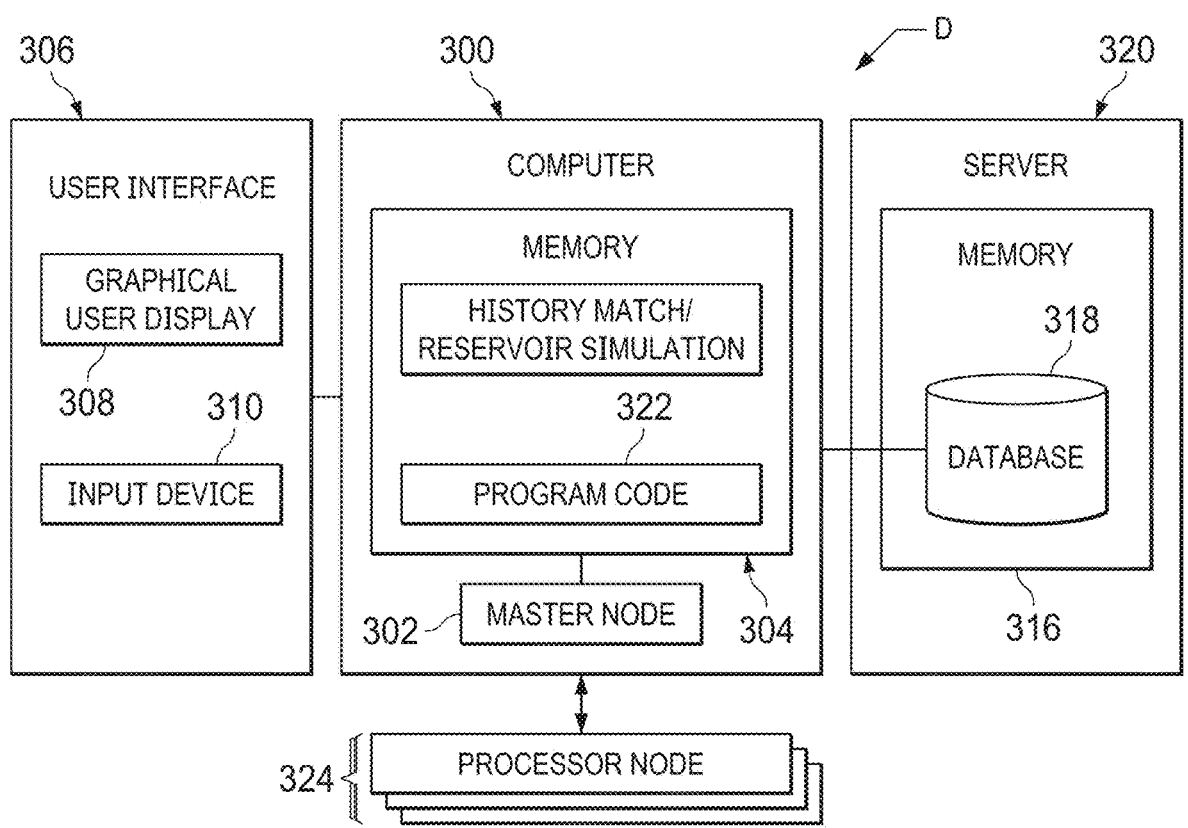
FIG. 18 is a schematic block diagram of a data processing system for determining an optimization of discrete fracture network (DFN) in a subsurface reservoir using streamlines and machine learning according to the present invention.

FIG. 4 is a schematic diagram of a workflow 100 according to the present invention determining a location for drilling a well in a subsurface geological structure of the subsurface hydrocarbon reservoir R. The processing workflow begins as indicated at 102 with reservoir parameters and properties from a plurality of disciplines of earth science being obtained, assembled and stored in a data processing system D (FIG. 18). As shown at 104 (FIG. 4), the reservoir parameters include a three-dimensional grid cell model of the x, y, z co-ordinates 64 of the subsurface reservoir; rock and mechanical properties as indicated at 106 from geological modeling; structural model measures as indicated at 108 from structural restoration models; formation rock parameters/rock geological characterizations (such as permeability, porosity, saturation) indicated at 110 obtained from formation core samples and well logs performed in the wellbores such as 36 and 38 (FIG. 1); and reservoir engineering measures obtained as indicated at 112 including observed as measures of fluid pressures, cumulative fluid flow, and cumulative water flow, as well as time interval fluid flow and water flow from production or injection from the wells 32, 34 and 40 of the subsurface reservoir R.

After the reservoir parameters are obtained and stored in the data processing system D, the discrete fracture network model 52 is obtained as indicated at 120 in the manner previously described. The discrete fracture network model 52 is then processed as indicated at 122 for determining an optimized discrete fracture network (DFN) model 52. The optimization processing 122 of the discrete fracture network model 52 is shown schematically in further detail in FIG. 5. The optimized discrete once determined is then available for further reservoir simulation of predicted production from the reservoir to provide a basis as indicated for location of further production or injection wells in the reservoir R.

As indicated schematically at 124, location and drilling of additional wells is then performed. The drilling during step 124 is at locations indicated appropriate by the models resulting from steps 120 and 122 which are indicated appropriate. Drilling during step 124 is thus directed to regions of the reservoir R where fractures of the types conducive to increased production are likely to be present. Drilling during step 124 is also enhanced by drilling to avoid earth regions where fractures of types which can cause complications in drilling operations or otherwise adversely affect drilling operations. With the present invention, wells are drilled based on the fracture modeling of the optimized discrete natural fracture model indicating characteristics of fractures in the subsurface reservoir formations.

Optimization Workflow

Figure 5:
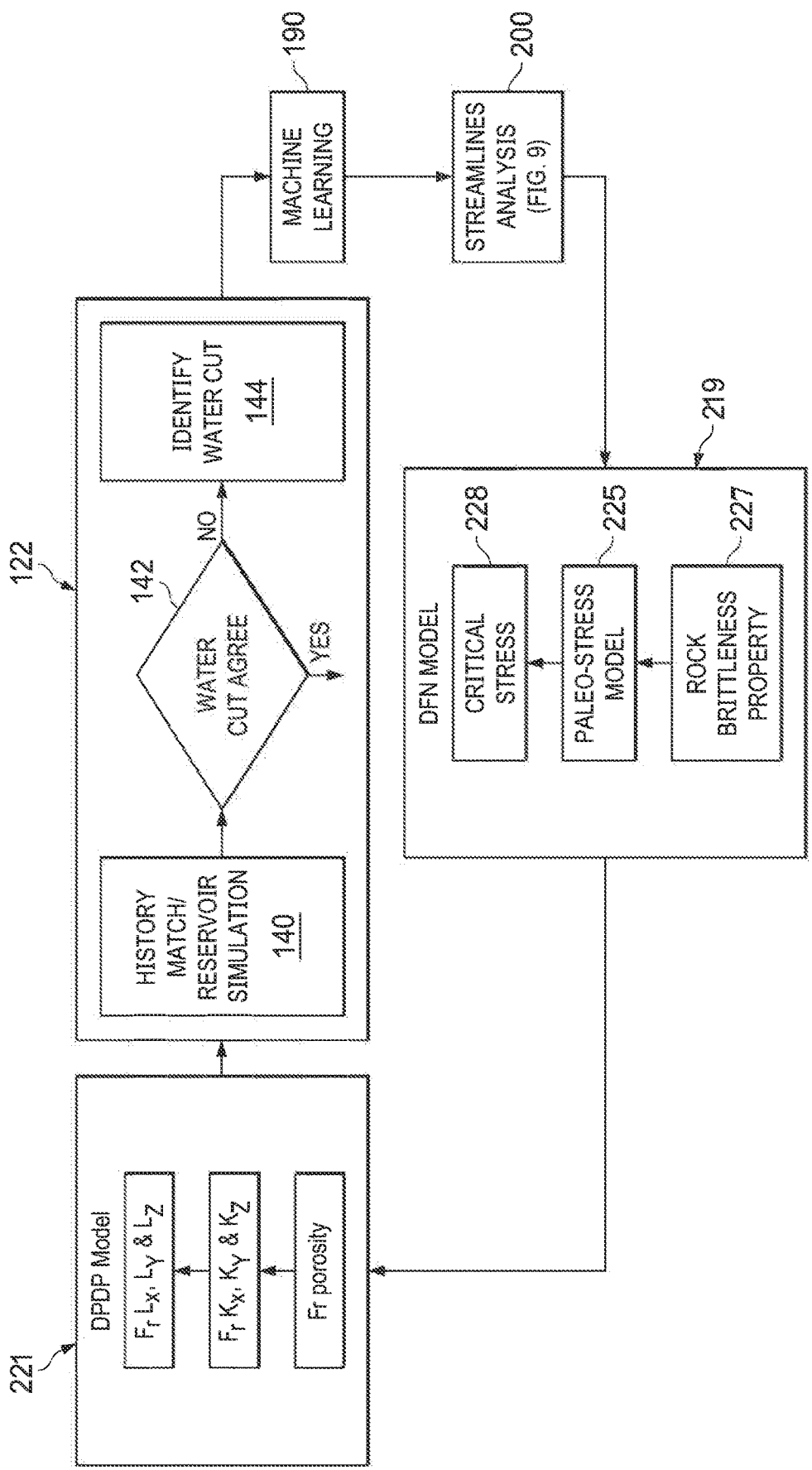
FIG. 5 is a schematic diagram of a segment of the workflow of FIG. 2 illustrating schematically a workflow for optimizing discrete fracture network models of a subsurface reservoir according to the present invention.

FIG. 5 is a schematic diagram of the optimization processing workflow 122 for determining the optimized discrete fracture network (DFN) model 52 of the subsurface reservoir R using streamlines and machine learning according to the present invention.

History Matching

As shown at 140 in FIG. 5, a reservoir simulation history match is performed based on measured water cut obtained from the obtained reservoir parameters. The reservoir simulation history match is based on a present version of the discrete fracture network (DFN) model 52. The reservoir simulation history match determines a simulated cumulative water cut of the fluids for a sequence of times of reservoir production during which observed water measures of actual production have been obtained from existing wells of the reservoir. The history matching 140 is performed by the history match reservoir simulator module M of the data processing system D (FIG. 18). A suitable reservoir simulator for performing the history matching 140 and also for reservoir simulation according to the present invention may be, for example, the GigaPOWERS reservoir simulation described in the literature in articles by Dogru, A. H. et al, "*A Next-Generation Parallel Reservoir Simulator for Giant Reservoirs*," SPE 119272, Proceedings of the 2009 SPE Reservoir Simulation Symposium, The Woodlands, Tex., USA, Feb. 2-4, 2009; and by Dogru, A. H; Fung, L. S; Middya, U.; Al-Shaalan, T. M.; Byer, T., Hoy, H. Hahn, W. A.; Al-Zamel, N.; Pita, J.; Hemanthkumar, K.; Mezghani, M.; Al-Mana, A.; Tan, J.; Dreiman, T.; Fugl, A.; Al-Baiz, A.; "*New Frontiers in Large Scale Reservoir Simulation*," SPE 142297, Proceedings of the 2011 SPE Reservoir Simulation Symposium.

History matching processing (also sometimes referred to as reservoir model validation) is performed to help reservoir engineers to validate reservoir models using production history data. History matching of the discrete fracture network model 52 of the reservoir is performed according to the present invention until predicted measures of water cut from the history matching closely reproduce the past historical water cut behavior of a reservoir. The historical production and pressures are matched as closely as possible. The accuracy of the history matching depends on the quality of the reservoir model including the discrete fracture network indicating the extent and location of fractures in the reservoir. Once the discrete fracture model 52 has been history matched, it is used by engineers in conjunction with other reservoir data to analyze future reservoir behavior with a higher degree of confidence.

Uncertainties/errors in forming a reservoir model propagate from various stages such as seismic interpretation through geological modelling and are thus present in the final reservoir model. When uncertainties are present, significant uncertainties about future production from reservoir simulation result. The present invention optimizes the discrete fracture network model in the reservoir model and significant uncertainties are reduced by confirming the discrete fracture model so that history match simulations of water cut conform to actual obtained actual historical data measures of water cut obtained during production. The present invention is integrated into a practical application by solving a technological problem in reservoir engineering by providing information about the extent and location of fractures in a subsurface reservoir.

Model validation by history matching of water cut according to the present invention is important by improving reservoir understanding regardless of reservoir complexities. With the present invention, more accurate information is provided about reservoirs and their fracture structure. For instance, a fault or channel not taken in consideration during the reservoir modeling stage may be revealed. The reservoir discrete fracture network and its extent, connectivity and location permit more accurate determination of locations for drilling a well with increased production from subsurface geological structure of the subsurface hydrocarbon reservoir. By confirming discrete fracture network models with history matching according to the present invention greater confidence is also provided in the forecasting production from hydrocarbon reservoirs.

Confirm/Verify Water Cut Measures

The predicted water cut results determined in history matching during step 140 are then compared with actual water cut measures during step 142 to confirm or the determined simulated cumulative water cut from the performed reservoir simulation history match matches specified production water cut criteria.

In a preferred embodiment, a suitable specified production water cut is one which differs from observed cumulative water cut by more than about ±10%. It should be understood that other water cut criteria may be used, if desired, based on reservoir engineering or production requirements, production costs or economic factors.

Identify/Characterize Water Cut Mismatch

If the simulated water cut is determined to satisfactorily match the produced water cut during step 142, the discrete fracture network formed according to the present invention is an accurate model of the subsurface reservoir fracture extent and locations. Such a model is then used during step 124 (FIG. 4) in connection with location of a well site and drilling an additional well or wells.

Figure 6:
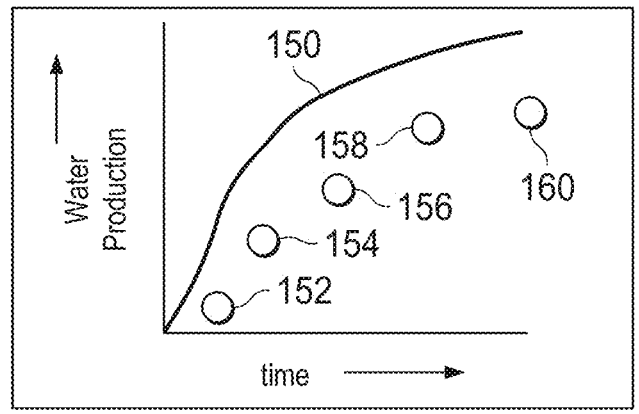
FIGS. 6, 7 and 8 are example displays of simulated water production from a subsurface reservoir model over time during processing according to FIG. 5 and representative of different water production conditions.
Figure 7:
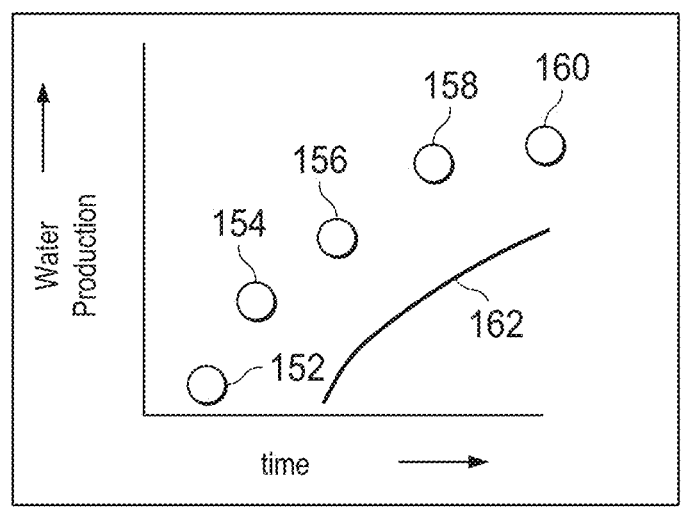

As indicated in FIG. 5, when the determined simulated cumulative water cut from the performed reservoir simulation history match does not match specified production criteria, step 144 is performed to identify or characterize the water cut mismatch. Step 144 determines an amount and type of water cut present for the various production wells in the reservoir R. There are three categorizations which is the result of step 144. They are as follows:

(a) High water production, or simulation overestimation vs history, as shown in FIG. 6;

(b) Low water production, or simulation underestimation vs history, as shown in FIG. 7; or (c) No water breakthrough, as shown in FIG. 8.

High water production (FIG. 6) is present in a production well when the difference (dW) between the total simulated water production (QwSim) and observed water production (QwObs) is equal or higher than 10% error, or:

$$(+dW=[QwSim-QwObs]=>10\%)$$

FIG. 6 illustrates an example of a high simulated or predicted water cut, with predicted history match reservoir simulation of water cut indicated at 150 being greater than measured or actual water cut at a sequence of time steps at 152, 154, 156, 158, and 160.

Low water cut is present in a production well (FIG. 7) when simulated or predicted history match reservoir simulation of water cut from such a well as indicated at 162 is less than measured or actual water cut at previously mentioned time steps 152, 154, 156, 158, and 160.

FIG. 8 illustrates an example of no simulated or predicted water cut indicated as a result of step 144 for comparison measured or actual water cut at previously mentioned time steps 152, 154, 156, 158, and 160.

Machine Learning

After characterization of the water cut mismatch during step 144, machine learning during step 190 is performed to adjust the current iteration of proposed discrete fracture network model by a genetic algorithm optimization to form another proposed discrete fracture network for optimization of the natural fracture network of the reservoir.

During step 190, machine learning processing is performed to minimize mismatch error utilizing suitable genetic algorithms. The genetic algorithms is performed by using methods and techniques as described, for example, in commonly owned U.S. patent application Ser. No. 16/695,946, "Modeling Reservoir Permeability Through Estimating Natural Fracture Distribution and Properties," filed Nov. 26, 2019, and now U. S. Published Patent Application No. 2020/0095858. These methods to minimize the difference between and fracture modeling properties and reservoir dynamic properties such as flow capacity or PLT (Production Log Test) are well known and can be adapted in order to apply locally to solve mish-match between the observed and predicted fracture permeability for small grid block models. After the calibrated process is completed then streamline analysis will be perform in order to adjust the simulated or cumulative water observed with the predicted.

The fracture properties (porosity, permeability, sigma factor) of grid block bundles identified as present in the previous iteration cycle of streamlines analysis are adjusted or optimized by machine learning by the adaptive genetic algorithm to obtain a more accurate estimate of fracture properties for the next successive iteration cycle of processing according to FIG. 5.

The genetic algorithm machine learning processing during step 190 generates fracture realizations iteratively until simulated cumulative water production during successive cycles of the processing according to FIG. 5 is equal or less than 2% observed cumulative water production or any user defined history matching criteria.

Streamlines Analysis

After the machine learning during step 190, streamlines analysis is performed during step 200 to identify the fracture flow paths for the fluids in the reservoir. The streamlines analysis identifies grid block bundles in the grid model of the reservoir R that dominate injector-producer interaction for the reservoir wells. Streamlines analysis provides the identified fracture flow paths to adjust discrete fracture network properties in reservoir areas of interest in order to achieve a more accurate history match of water cut during a subsequent iteration of processing according to FIG. 5. The streamlines analysis processing methodology speeds up the history matching process in comparison to conventional cell by cell reservoir simulation history match methods. If desired, the discrete fracture network modifications is made in agreement with the concept of multiple realizations as provided by geologist.

FIG. 9 is a schematic diagram of a workflow for streamline analysis processing 200 by the data processing system D according to FIG. 5. As indicated at 202, during streamlines analysis, selection of a water mismatch producer or producers among the reservoir wells is provided by a reservoir engineer or analyst.

Figure 11:
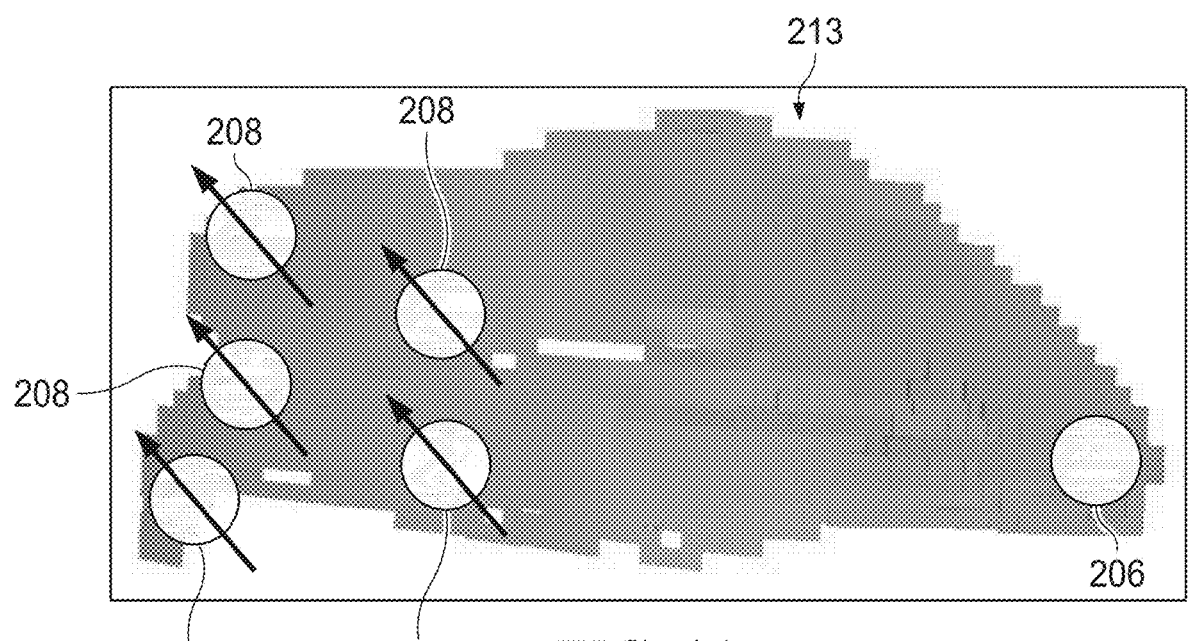
Figure 12:
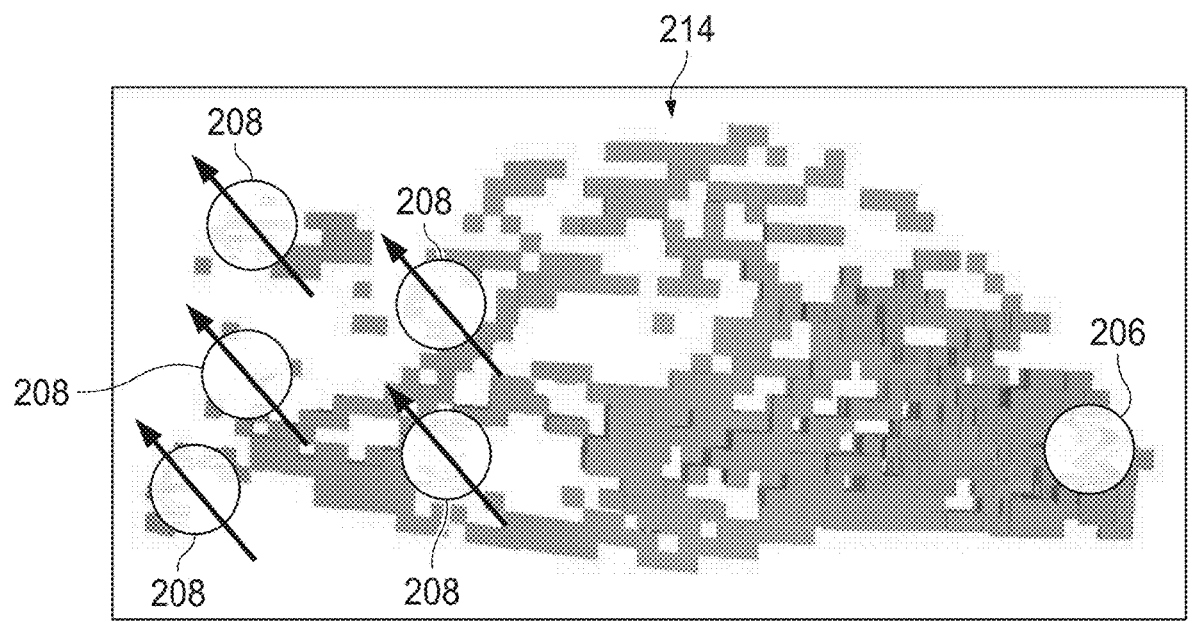

FIGS. 10, 11 and 12 are simulated example displays of results of step 202 when presence of either a high or a low water production or water cut is determined. As indicated at step 204, a producer/injector pair (or set) is formed or identified as indicated by a producer well indicated schematically at 206 (FIGS. 10-12) and injector wells as indicated schematically at 208 based on streamlines. More explanation of this step can be found in the SPE Paper No. 188073-MS "An Effective Streamline History Matching Technique."

Next, during step 210, streamlines 211 (FIG. 10) identified during step 202 are mapped within the computerized reservoir grid as indicated schematically at 213 in FIG. 11. During step 212, the mapped streamlines 213 are filtered according to x, y, z co-ordinates for correspondence with grid cells which have been indicated in the present realization of the discrete fracture model 52 as having fractures present. The results of step 212 are indicated at 214 in FIG. 12.

Figure 13:
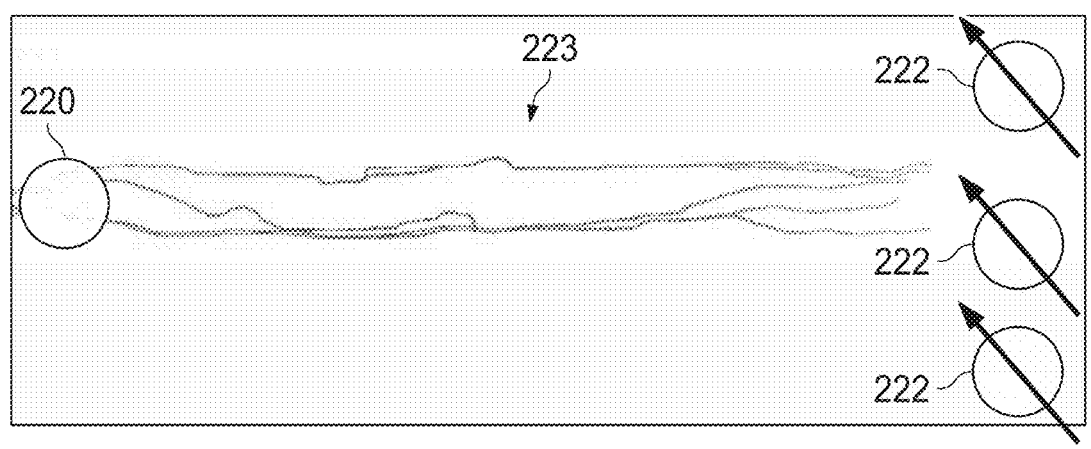
Figure 14:
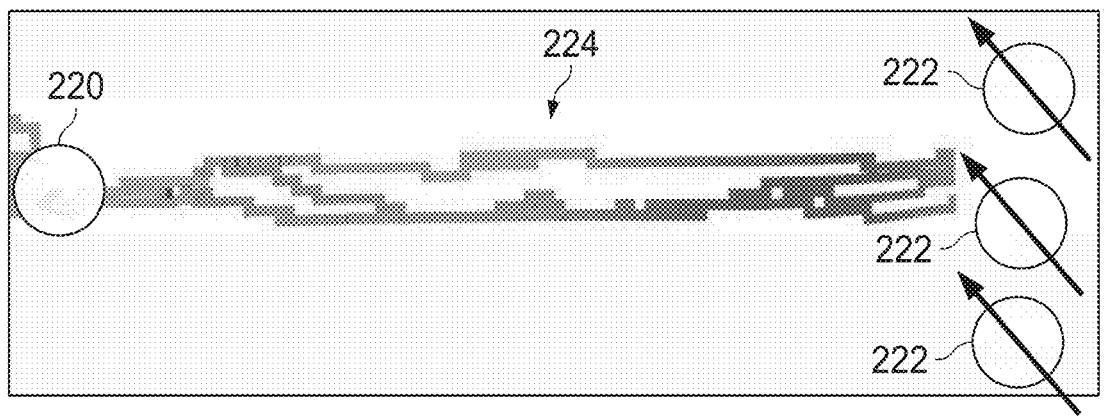
Figure 15:
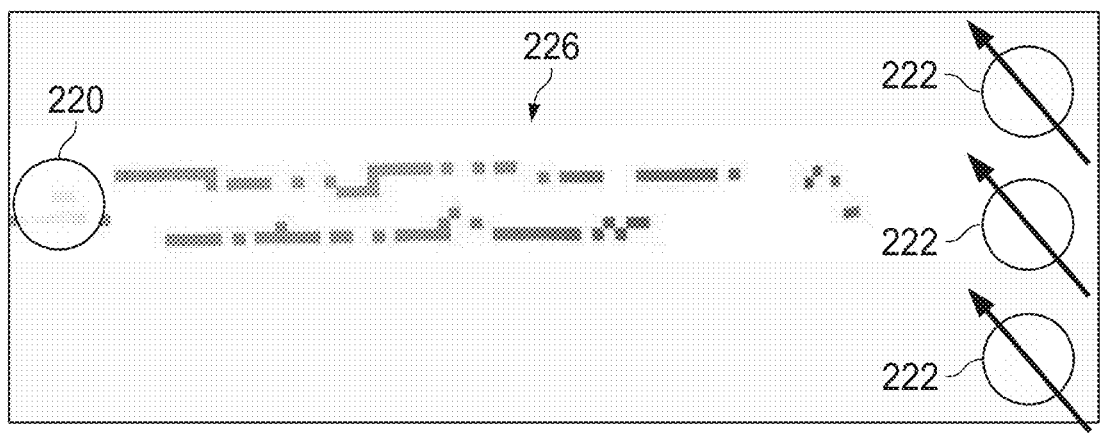

FIGS. 13, 14 and 15 are simulated example displays of results of step 202 when no water cut or production is determined to be present. As indicated in FIGS. 13-15, a producer/injector pair (or set) is formed or identified as indicated by a producer well indicated schematically at 220. Injector wells of the producer/injector pair are indicated schematically at 222.

Streamline analysis according to the present invention to produce resultant streamlines 223 (FIG. 13) may be performed, for example, by determining fluid fluxes with finite-difference simulation according to the methodology described in the previously mentioned GigaPOWERS reservoir simulation described in earlier portions of the present application. The results of the finite-difference simulation are then post-processed to generate streamlines such as those shown as new fracture realizations at 224 (FIG. 14), mapping them and extract corresponding derived attributes as shown with the GigaPOWERS reservoir simulation. The streamline analysis may also be performed by streamline-based history matching such as that described "Streamline Simulation: Theory And Practice" by Akhil Datta-Gupta and Michael J. King, pages 148-156.

The new fracture realizations 224 (FIG. 14) formed by streamline analysis when no water cut is indicated are then filtered according to x, y, z co-ordinates for correspondence with grid cells of the discrete fracture model 52 as indicated at 226 (FIG. 15).

Streamlines analysis during step 200 identifies grid block bundles that dominates water production error. Streamline analysis provides an alternative to cell-based grid techniques in reservoir simulation. Streamlines represent a snapshot of the instantaneous flow field and thereby produces data such as drainage/irrigation regions associated with producing/injecting wells and flow rate allocation between injector/producer pairs that are not easily determined by other conventional reservoir simulation techniques.

After streamlines analysis during step 200, processing is transferred to step 219 for repeating the processing to form another realization of a proposed discrete fracture network for continued processing.

Discrete Fracture Model

The current or present iteration version of the reservoir discrete fracture network model 52 is processed to form a subsequent or next successive realization in the iterative processing according to FIG. 5. Formation of the next iteration realization involves discrete network adjustment or modification as indicated at 219 and dual porosity/dual permeability model adjustment or modification as indicated at 221. Multiple fracture realizations are run for a number of iterations until a satisfactory match is obtained as confirmed during step 140.

Discrete fracture network realizations are constrained by geomechanical drivers. The parameterization of the main variables of reservoir parameters stored during step 102 (FIG. 2) in memory in data processing system D serves to constrain the fracture presence or position within the 3D geo-cellular grid model 104 of the reservoir. The reservoir parameters typically include, for example: fracture density, length, orientation and geometry (length/height), which are controlled by borehole image log interpretation (BHI); brittleness property; paleo-stress tectonic analysis; and an "In-situ" stress regime.

The fracture aperture for the fracture model is constrained by using the aperture calculations from borehole images. The intrinsic permeability is modeled (permeability values assigned to the fracture plane using initial correlations such as cubic law function) by using the critical stress analysis, which related the stress distribution and the fracture planes in terms of hydraulic permeability, the method is described in Min, Ki-Bok et al, Stress-Dependent Permeability of Fractured Rock Masses: A Numerical Study, International Journal of Rock Mechanics and Mining Sciences, 2004, pp 1191-1210, Vol 41, Issue 7, Engineering Geology and Geophysics Research, Sweden and using stress-dependent permeability model for fractures.

Rock Brittleness Property

A rock brittleness property is differentiated when a rock sample is subjected to stress, since the sample breaks without significant plastic deformation. Brittle materials absorb relatively little energy prior to fracture, even those of high strength. In a complex heterogeneous fracture rock mass, the brittleness property is modeled as indicated schematically at 227 using neuronal network classification taking as inputs the elastic properties and stress regime which is producing mechanical facies. The mechanical facies should preferably have some proportional relation with the distribution of natural fractures. This correlation is evaluated by using histograms filtered by density fracture.

Paleo-Stress Model

At 3D modeling stage, geomechanics numerical simulation is performed using elements methods to be able to capture main episodes for paleo-stress tectonic deformation that could create most of the fracture observed at well level. During step 225, the fractures observed at well level are modeled preferably according to two conventional processes: folding fracture related, and faulting fracture related. Additionally, the in-situ stress regime is modeled to capture features for the mechanical rock properties such as brittleness model, geomechanical facies, and in-situ stress rotations and stress magnitude variation along the field.

Critical Stress Analysis

Critical stress criteria concepts are used during the methodology of critical stress analysis step 228. The critical stress analysis is according to what is known as the Coulomb criterion, which depends on the stress magnitude and the orientation of the fracture plane with respect to the "In situ" stress orientation. The "In situ" stress orientation impacts both the normal and shear stresses on the fracture plane.

When shear stress exceeds shear stiffness, shearing cause's dilation that keeps the fracture hydraulically open. Rogers, Stephen F., Critical Stress-Related Permeability in Fractured Rocks, Jan. 1, 2003, Chpt 2, Fracture and In-Situ Stress Characterization of Hydrocarbon Reservoirs, (Ameen) Geoscience World, The Geological Society of London, 2003, pp 7-16. Fractures in this stress state are referred to be reactivated or critically stressed, (Barton, C. A. et al, Fluid Flow Along Potentially Active Faults in Crystalline Rock, Geology; August 1995; p 683-686, v. 23, no. 8; Rogers, 2003, supra] as is shown in the FIG. 13.

Figure 16:
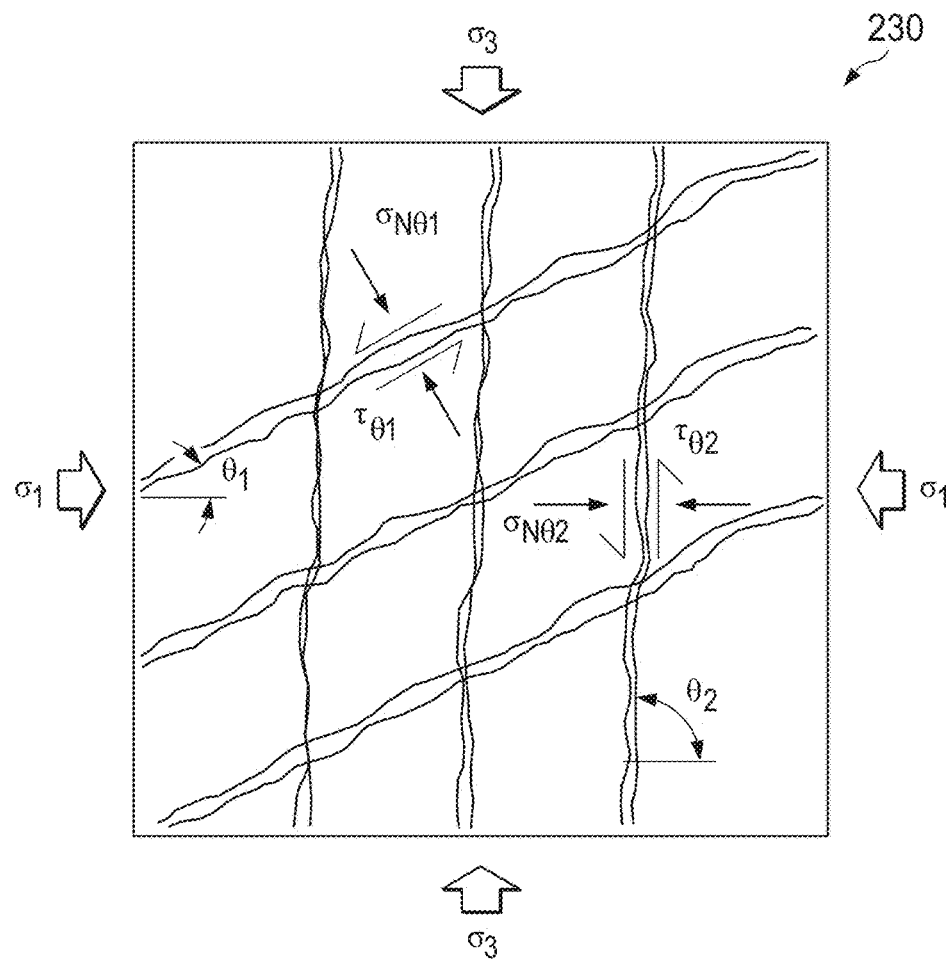
FIG. 16 is a schematic diagram of nonlinear behavior of stress conditions due to a fracture aperture in a subsurface rock formation.

FIG. 16 is a schematic diagram of a formation fracture model 230 of an in situ heterogeneous stress field which is formed during step 228 (FIG. 5). The formation fracture model 230 is formed to identify portions of the reservoir discrete fracture network hydraulically open for passage of flow. Determination of such a portion and its distribution in the rock is based on whether the fractures are critically stressed. In determining critical stress, a physical phenomenon known as the Coulomb friction criterion is applicable.

The Coulomb criterion depends on the stress magnitude and the orientation of the fracture in the in situ heterogeneous stress field present in a formation. The fracture orientation with respect to the stress directions has significant impact on determination of normal and shear stresses on a fracture plane. When shear stress exceeds shear stiffness, the resultant shearing causes dilation keeps the fracture hydraulically open. Fractures in this stress state are referred to as reactivated or critically stressed. Fractures in this stress state are according to the present invention defined as critically stressed fractures in calculating the fracture aperture as a function of the shearing dilatations, as will be described.

Critical stress analysis is a function of normal stress $\sigma_N$, shear stress $\tau$ and fluid pressure. In the example fracture model F shown in FIG. 13, normal stress $\sigma_N$ is expressed according to Equation (1) as follows:

$$\sigma_N = 0.5*(\sigma_1+\sigma_3)+0.5*(\sigma_1+\sigma_3)*\cos 2\theta \quad \text{(Equation 1)}$$

The shear stress $\tau$ is expressed according to Equation (2) as follows:

$$\tau = 0.5*(\sigma_1-\sigma_3)*\sin 2\theta \quad \text{(Equation 2)}$$

In Equations (1) and (2), $\sigma_1$ and $\sigma_3$ are the maximum and minimum horizontal stresses in a horizontal plane-strain cross section of the fracture network $P_f$. $\theta$ is the angle between the plane of normal stress $\sigma_N$ and the direction of maximum stress $\sigma_1$ as shown in FIG. 13. Further discussions are contained in *Reservoir Geomechanics*, Mark D. Zoback, Cambridge University Press, UK, 2007.

Figure 17:
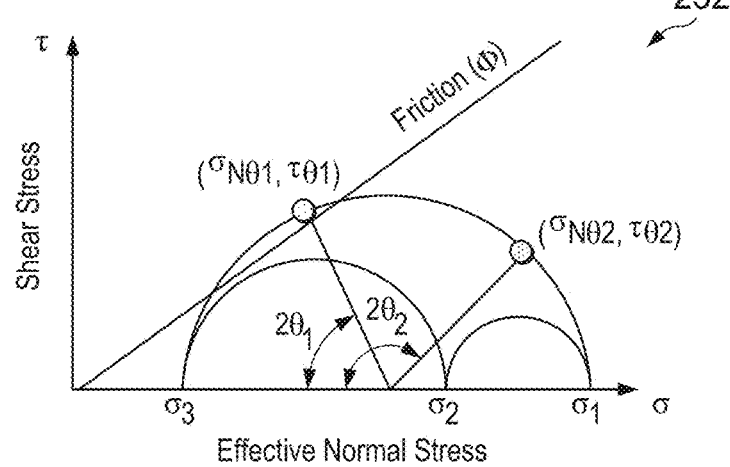
FIG. 17 is a Mohr diagram of rock coefficient of friction as a function of effective normal stress forces shown in FIG. 13.

The relation between normal stress $\sigma_N$, shear stress $\tau$ and coefficient of friction $\phi$ in a rock matrix is represented graphically in what are known as Mohr diagrams or circles. An example Mohr diagram 232 (FIG. 17) indicates rock coefficient of friction $\phi$ as a function of shear stress $\tau$ and effective normal stress $\sigma_N$ for the heterogeneous stress conditions indicated schematically in FIG. 13.

In the context of the present invention, the Mohr's diagrams are graphical representations in two or three dimensions of stress conditions in a rock mass at different planes oriented as functions of orientation angle $\theta_i$ of planes passing through a point of interest in the rock. The Mohr's circles permit determination at the point of interest of principal normal stresses $\sigma_{max}$ and $\sigma_{min}$, maximum and minimum shear stresses $\tau_{max}$, $\tau_{min}$ as well as the orientation of the principal planes. Details of Mohr's circles are explained, for example, in Mohr's Circle. Mohr's Circle, Wikipedia, April, 2019, https.//en.wikipedia.org.Mohr%27s_circle.

The new fracture realization so formed as indicated at step 228 with different fractured permeability is then provided for further processing to form a dual porosity, dual permeability (DPDP) model as indicated at 221.

Dynamic Dual Porosity Dual Permeability Simulation Model

In a naturally fractured reservoir, fluid exists in dual media: the rock matrix and the highly permeable rock fractures. To model such systems in any dynamic simulator, input is required for each block reservoir grid block representing the matrix and fracture volume. The parameters that are important dynamically are explained below and are imported from the fracture model into the simulation model through a scale-up process where the explicit representations of the fracture planes are converted to tensor properties. The resultant tensor properties from the fracture modeling process are described, for example, in commonly owned U.S. patent application Ser. No. 15/704,236, "Subsurface Reservoir Model With 3D Natural Fractures Prediction," now U.S. Pat. No. 10,607,043 dated Mar. 31, 2020.

Fracture Permeability

Each fracture is represented by 3D fracture permeability assigned in x, y and z direction. With the present invention, fracture permeability is the main influential parameter to influence the matching of historical production.

Fracture Porosity

Each grid block in the DPDP model being formed is assigned a fracture porosity. In assigning the fracture porosity, a sigma shape factor $\sigma$ is developed. The sigma shape factor $\sigma$ parameter is different from stress tensors $\sigma_N$, $\sigma_1$, $\sigma_3$, $\sigma_{max}$ and $\sigma_{min}$ defined in the critical stress analysis discussed in connection with FIG. 16 of the present application.

The sigma shape factor $\sigma$ is a transfer function between the grid matrix blocks and fractures. The sigma shape factor is related to the reservoir grid matrix block size by following expression:

$$\sigma = 4\left(\frac{1}{l_x^2} + \frac{1}{l_y^2} + \frac{1}{l_z^2}\right) \quad \text{Equation (3)}$$

where $l_x$, $l_y$ and $l_z$ are x, y and z dimensions of the grid matrix blocks.

After processing to form the adjusted discrete fracture model during step 219 and the dual porosity/dual permeability model for the grid matrix during step 221, the resultant adjusted model is then provided for processing during step 140 by history match reservoir simulation in the manner described to determine predicted water cut during the next iteration cycle.

The present invention can thus be understood to utilize streamlines analysis to identify the grid block bundles that dominate injector-producer interaction. It provides for adjustment of discrete fracture network properties in areas of interest identified by streamlines in order to achieve a reasonable history match. This methodology speeds up the history matching process in comparison to the conventional method. Moreover, the discrete fracture network modifications are in agreement with the concept of multiple realizations as provided by geologist.

Data Processing System

As illustrated in FIG. 18, the data processing system D includes a computer 300 having a master node processor 302 and memory 304 coupled to the processor 302 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 300 is accessible to operators or users through user interface 306 and are available for displaying output data or records of processing results obtained according to the present invention with an output graphic user display 308. The output display 308 includes components such as a printer and an output display screen capable of providing printed output information or visible displays in the form of graphs, data sheets, graphical images, data plots and the like as output records or images.

The user interface 306 of computer 300 also includes a suitable user input device or input/output control unit 310 to provide a user access to control or access information and database records and operate the computer 300. Data processing system D further includes a database of data stored in computer memory, which may be internal memory 304, or an external, networked, or non-networked memory as indicated at 316 in an associated database 318 in a server 320.

The data processing system D includes program code 322 stored in non-transitory memory 304 of the computer 300. The program code 322 according to the present invention is in the form of computer operable instructions causing the data processor 302 to determine calibrated minimum horizontal stress magnitude using fracture closure pressure and multiple mechanical earth model realizations according to the present invention in the manner set forth.

It should be noted that program code 322 may be in the form of microcode, programs, routines, or symbolic computer operable languages capable of providing a specific set of ordered operations controlling the functioning of the data processing system D and direct its operation. The instructions of program code 322 may be stored in memory 304 of the data processing system D, or on computer diskette, magnetic tape, conventional hard disk drive, electronic read-only memory, optical storage device, or other appropriate data storage device having a computer usable non-transitory medium stored thereon. Program code 322 may also be contained on a data storage device such as server 300 as a non-transitory computer readable medium, as shown.

The data processing system D may be comprised of a single CPU, or a computer cluster as shown in FIG. 18, including computer memory and other hardware to make it possible to manipulate data and obtain output data from input data. A cluster is a collection of computers, referred to as nodes, connected via a network. Usually a cluster has one or two head nodes or master nodes 302 used to synchronize the activities of the other nodes, referred to as processing nodes 324. The processing nodes 324 each execute the same computer program and work independently on different segments of the grid which represents the reservoir.

From the foregoing, it is appreciated that the present invention provides a methodology to optimize the dynamic connectivity of a Discrete Fracture Network (DFN) against observed data using streamlines and machine learning. The present invention enables adjustment of discrete fracture network properties locally and minimizes time spent in history matching.

The present invention enables reservoir engineers to identify history match issues, while also providing insights into a reservoir discrete fracture network and improving history match quality. The streamlines analysis according to the present invention quantifies injector-producer flow communication and identifies the grid block bundles of the reservoir grid that dominate dynamic production response of the reservoir. The machine learning genetic algorithm updates discrete fracture network model properties to improve dynamic history match response.

The invention has been sufficiently described so that a person with average knowledge in the field of reservoir engineering may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there are improvements and modifications made of the present invention described in detail above without departing from the spirit or scope of the invention as set forth in the accompanying claims.

What is claimed is:

1. A method of determining a location for drilling a well in a subsurface geological structure of a subsurface hydrocarbon reservoir having existing wells producing fluids comprising hydrocarbons and exhibiting water cut representing water mixed in the fluids being produced, the location being determined indicated by an optimized natural fracture network model of a natural fracture network of the reservoir, the method comprising:
   (a) obtaining reservoir parameters representing properties of the subsurface reservoir for processing in a data processing system, the reservoir properties including observed cumulative water cut of the produced fluids during production from the existing wells;
   (b) forming a proposed discrete fracture network model indicating the nature and extent of discrete fractures and fracture flow paths in the reservoir;
   (c) performing, using the proposed discrete fracture network model, a reservoir simulation history match from the obtained reservoir parameters to determine simulated cumulative water cut of the fluids;
   (d) determining a measure of a difference between the determined simulated cumulative water cut from the performed reservoir simulation history match and the observed cumulative water cut of the produced hydrocarbon fluids from the existing wells;
   (e) determining if the determined simulated cumulative water cut from the performed reservoir simulation history match matches specified production criteria;
   (f) in response to determining that the simulated cumulative water cut from the performed reservoir simulation history match does not match specified production criteria:
      (1) determining an amount and type of water cut present in the determined simulated cumulative water cut from the performed reservoir simulation history match;
      (2) adjusting the proposed discrete fracture network model by a genetic algorithm optimization to form an other proposed discrete fracture network for optimization of the natural fracture network of the reservoir;
      (3) performing streamline analysis of fluid flow in the reservoir based on the other proposed discrete fracture network and the determined simulated cumulative water cut to identify fracture flow paths in the reservoir; and
      (4) returning to step (c) using the other proposed discrete fracture network as the proposed discrete fracture network, and
   (g) in response to determining that the cumulative water cut from the performed reservoir simulation history match satisfies the specified production criteria,
      (1) adjusting the proposed discrete fracture network to conform to the optimized natural fracture network; and
      (2) drilling a proposed well at the location indicated by the optimized natural fracture network.

2. The method of claim 1, wherein the step of performing streamline analysis comprises the steps of:
   (a) mapping streamlines between existing injector wells and producing wells in the reservoir; and
   (b) recording locations in the reservoir model where streamlines are present.

3. The method of claim 1, wherein the reservoir parameters further comprise reservoir geological model and observed reservoir production flow rates and pressures.

4. The method of claim 1, wherein the specified production criteria comprises water cut being less than a specified percentage of cumulative fluid production from the reservoir.

5. The method of claim 4, wherein the specified percentage of cumulative fluid production from the reservoir comprises about 2%.

6. The method of claim 1, further including the step of forming a double porosity, double permeability model of the reservoir based on the form another proposed discrete fracture network.

7. The method of claim 1, wherein the determined amount and type of water cut present comprises high water cut.

8. The method of claim 1, wherein the determined amount and type of water cut present comprises low water cut.

9. The method of claim 1, wherein the determined amount and type of water cut present comprises absence of water cut.

10. A data processing system for determining a location for drilling a well in a subsurface geological structure of a subsurface hydrocarbon reservoir having existing wells producing fluids comprising hydrocarbons and exhibiting water cut representing water mixed in the fluids being produced, the location being determined indicated by an optimized natural fracture network model of a natural fracture network of the reservoir, the data processing system comprising:
- a memory storing computer operable program instructions to control the data processing system to optimize the natural fracture network;
- a data input obtaining reservoir parameters representing properties of the subsurface reservoir for processing in a data processing system, the reservoir properties including observed cumulative water cut of the produced fluids during production from the existing wells;
- a processor operating under the control of the stored computer operable program instructions and configured to perform the following:
  - (a) forming a proposed discrete fracture network model indicating the nature and extent of discrete fractures and fracture flow paths in the reservoir;
  - (b) performing, using the proposed discrete fracture network model, a reservoir simulation history match from the obtained reservoir parameters to determine simulated cumulative water cut of the fluids;
  - (c) determining a measure of a difference between the determined simulated cumulative water cut from the performed reservoir simulation history match and the observed cumulative water cut of the produced hydrocarbon fluids from the existing wells;
  - (d) determining if the determined simulated cumulative water cut from the performed reservoir simulation history match matches specified production criteria;
  - (e) in response to determining that the simulated cumulative water cut from the performed reservoir simulation history match does not match specified production criteria:
    - (1) determining an amount and type of water cut present in the determined simulated cumulative water cut from the performed reservoir simulation history match;
    - (2) adjusting the proposed discrete fracture network model by a genetic algorithm optimization to form an other proposed discrete fracture network for optimization of the natural fracture network of the reservoir;
    - (3) performing streamline analysis of fluid flow in the reservoir based on the proposed discrete fracture network and the determined simulated cumulative water cut to identify the fracture flow paths for the fluids in the reservoir;
    - (4) returning to step (b) using the other proposed discrete fracture network as the proposed discrete fracture network, and
  - (f) in response to determining that the determined cumulative water cut from the performed reservoir simulation history match satisfies the specified production criteria, adjusting the proposed discrete fracture network to conform to the optimized natural fracture network for drilling a proposed well at the location indicated by the optimized natural fracture network.

11. The data processing system of claim 10, wherein the step of performing streamline analysis comprises the steps of:
- (a) mapping streamlines between existing injector wells and producing wells in the reservoir; and
- (b) recording locations in the reservoir model where streamlines are present.

12. The data processing system of claim 10, wherein the reservoir parameters further comprise reservoir geological model and observed reservoir production flow rates and pressures.

13. The data processing system of claim 10, wherein the specified production criteria comprises water cut being less than a specified percentage of cumulative fluid production from the reservoir.

14. The data processing system of claim 13 wherein the specified percentage of cumulative fluid production from the reservoir comprises about 2%.

15. The data processing system of claim 10, wherein the processor further performs the step of forming a double porosity, double permeability model of the reservoir based on the form another proposed discrete fracture network.

16. The data processing system of claim 10, wherein the determined amount and type of water cut present comprises high water cut.

17. The data processing system of claim 10, wherein the determined amount and type of water cut present comprises low water cut.

18. The data processing system of claim 10, wherein the determined amount and type of water cut present comprises absence of water cut.

19. A computer implemented method of determining a location for drilling a well in a subsurface geological structure of a subsurface hydrocarbon reservoir having existing wells producing fluids comprising hydrocarbons and exhibiting water cut representing water mixed in the fluids being produced, the location being determined indicated by an optimized natural fracture network model of a natural fracture network of the reservoir, the computer implemented method comprising:
- (a) storing, in a data processing memory computer operable program instructions to control a data processing system to optimize the natural fracture network;
- (b) obtaining reservoir parameters representing properties of the subsurface reservoir for processing in the data processing system, the reservoir properties including observed cumulative water cut of the produced fluids during production from the existing wells;
- (c) forming a proposed discrete fracture network model indicating the nature and extent of discrete fractures and fracture flow paths in the reservoir;
- (d) performing, using the proposed discrete fracture network model, a reservoir simulation history match from the obtained reservoir parameters to determine simulated cumulative water cut of the fluids;
- (e) determining a measure of a difference between the determined simulated cumulative water cut from the performed reservoir simulation history match and the observed cumulative water cut of the produced hydrocarbon fluids from the existing wells;
- (f) determining if the determined simulated cumulative water cut from the performed reservoir simulation history match matches specified production criteria;
- (g) in response to determining that the determined simulated cumulative water cut from the performed reservoir simulation history match does not match specified production criteria:

(1) determining an amount and type of water cut present in the determined simulated cumulative water cut from the performed reservoir simulation history match;

(2) adjusting the proposed discrete fracture network model by a genetic algorithm optimization to form an other proposed discrete fracture network for optimization of the natural fracture network of the reservoir;

(3) performing streamline analysis of fluid flow in the reservoir based on the proposed discrete fracture network and the determined simulated cumulative water cut to identify the fracture flow paths for the fluids in the reservoir;

(4) returning to step (d) using the other proposed discrete fracture network as the proposed discrete fracture network, and (h) in response to determining that the determined cumulative water cut from the performed reservoir simulation history match satisfies the specified production criteria, adjusting the proposed discrete fracture network to conform to the optimized natural fracture network for drilling a proposed well at the location indicated by the optimized natural fracture network.

20. The computer implemented method of claim 19, wherein the step of performing streamline analysis comprises the steps of:

(a) mapping streamlines between existing injector wells and producing wells in the reservoir; and (b) recording locations in the reservoir model where streamlines are present.

21. The computer implemented method of claim 19, wherein the reservoir parameters further comprise reservoir geological model and observed reservoir production flow rates and pressures.

22. The computer implemented method of claim 19, wherein the specified production criteria comprises water cut being less than a specified percentage of cumulative fluid production from the reservoir.

23. The computer implemented method of claim 22, wherein the specified percentage of cumulative fluid production from the reservoir comprises about 2%.

24. The computer implemented method of claim 19, further including the step of forming a double porosity, double permeability model of the reservoir based on the form another proposed discrete fracture network.

25. The computer implemented method of claim 19, wherein the determined amount and type of water cut present comprises high water cut.

26. The computer implemented method of claim 19, wherein the determined amount and type of water cut present comprises low water cut.

27. The computer implemented method of claim 19, wherein the determined amount and type of water cut present comprises absence of water cut.

28. A data storage device having stored in a non-transitory computer readable medium computer operable instructions for causing a data processing system to determine a location for drilling a well in a subsurface geological structure of a subsurface hydrocarbon reservoir having existing wells producing fluids comprising hydrocarbons and exhibiting water cut representing water mixed in the fluids being produced, the location being determined indicated by an optimized natural fracture network model of a natural fracture network of the reservoir, the instructions stored in the data storage device causing the data processing system to perform the following steps:

(a) storing, in a data processing memory, computer operable program instructions to control a data processing system to optimize the natural fracture network;

(b) obtaining reservoir parameters representing properties of the subsurface reservoir for processing in the data processing system, the reservoir properties including observed cumulative water cut of the produced fluids during production from the existing wells;

(c) forming a proposed discrete fracture network model indicating the nature and extent of discrete fractures and fracture flow paths in the reservoir;

(d) performing, using the proposed discrete fracture network model, a reservoir simulation history match from the obtained reservoir parameters to determine simulated cumulative water cut of the fluids;

(e) determining a measure of a difference between the determined simulated cumulative water cut from the performed reservoir simulation history match and the observed cumulative water cut of the produced hydrocarbon fluids from the existing wells;

(f) determining if the determined simulated cumulative water cut from the performed reservoir simulation history match matches specified production criteria;

(g) in response to determining that the determined simulated cumulative water cut from the performed reservoir simulation history match does not match specified production criteria:

(1) determining an amount and type of water cut present in the determined simulated cumulative water cut from the performed reservoir simulation history match;

(2) adjusting the proposed discrete fracture network model by a genetic algorithm optimization to form an other proposed discrete fracture network for optimization of the natural fracture network of the reservoir;

(3) performing streamline analysis of fluid flow in the reservoir based on the proposed discrete fracture network and the determined simulated cumulative water cut to identify the fracture flow paths for the fluids in the reservoir;

(4) returning to step (d) using the other proposed discrete fracture network as the proposed discrete fracture network, and (k) in response to determining that the determined cumulative water cut from the performed reservoir simulation history match satisfies the specified production criteria, adjusting the proposed discrete fracture network to conform to the optimized natural fracture network for drilling a proposed well at the location indicated by the optimized natural fracture network.

29. The data storage device of claim 28, wherein the stored instructions for performing streamline analysis comprise instructions for performing steps of:

(a) mapping streamlines between existing injector wells and producing wells in the reservoir; and (b) recording locations in the reservoir model where streamlines are present.

30. The data storage device of claim 28, wherein the obtained reservoir parameters further comprise reservoir geological model and observed reservoir production flow rates and pressures.

31. The data storage device of claim 28, wherein the specified production criteria comprises water cut being less than a specified percentage of cumulative fluid production from the reservoir.

32. The data storage device of claim 31, wherein the specified percentage of cumulative fluid production from the reservoir comprises about 2%.

33. The data storage device of claim 28, wherein the stored instructions further include instructions for performing the step of forming a double porosity, double permeability model of the reservoir based on the form another proposed discrete fracture network.

34. The data storage device of claim 28, wherein the determined amount and type of water cut present comprises high water cut.

35. The data storage device of claim 28, wherein the determined amount and type of water cut present comprises low water cut.

36. The data storage device of claim 28, wherein the determined amount and type of water cut present comprises absence of water cut.

* * * * *